Figure 1:
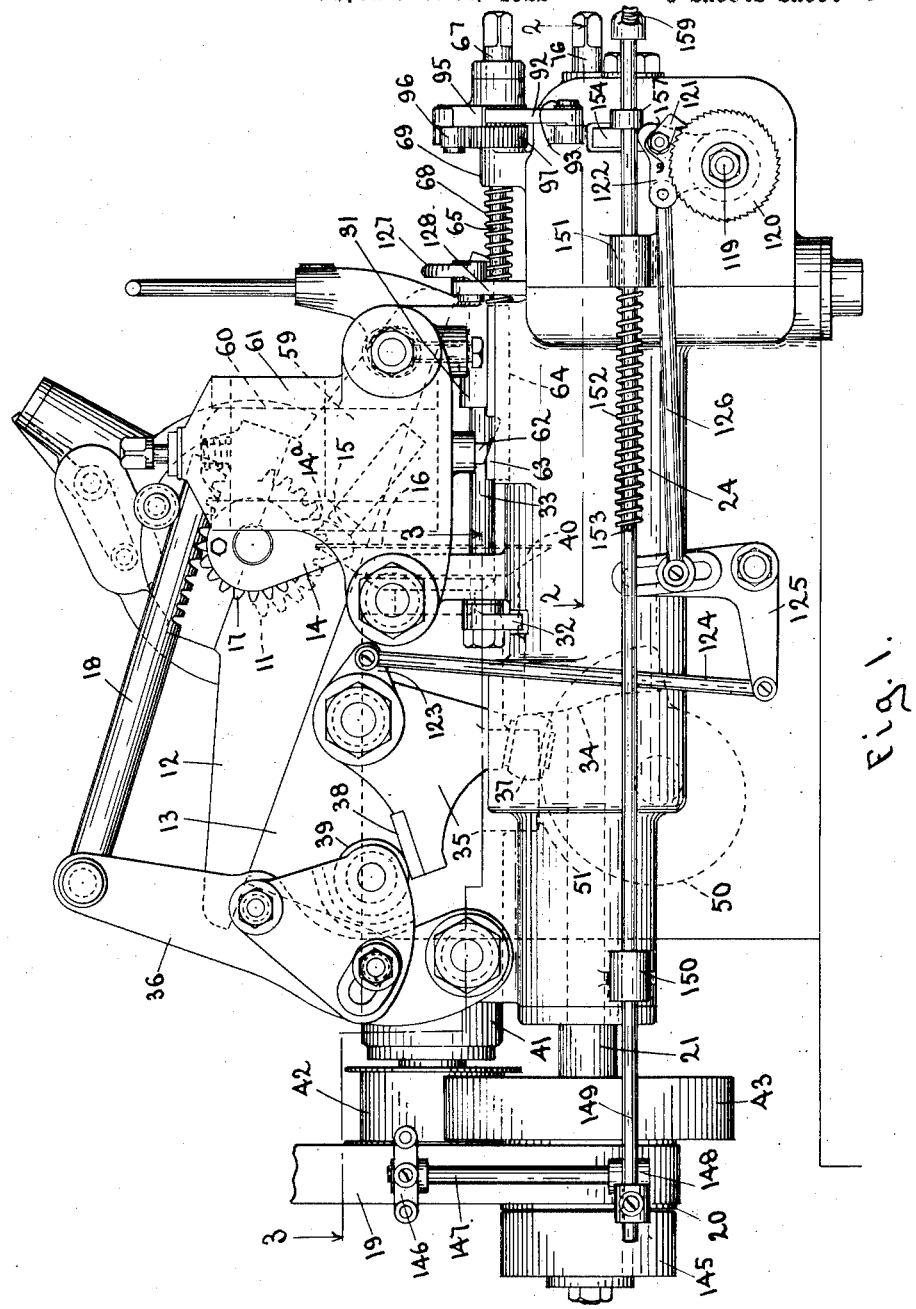

May 10, 1927.

E. R. FELLOWS 1,628,584

AUTOMATIC GEAR GENERATING MACHINE

Filed Oct. 18, 1922   6 Sheets-Sheet 3

INVENTOR
Edwin R. Fellows by Wright, Brown, Quinby & May
att'ys

May 10, 1927.

E. R. FELLOWS 1,628,584

AUTOMATIC GEAR GENERATING MACHINE

Filed Oct. 18, 1922 6 Sheets-Sheet 4

INVENTOR
Edwin R. Fellows by Wright, Brown, Quinby & May
attys

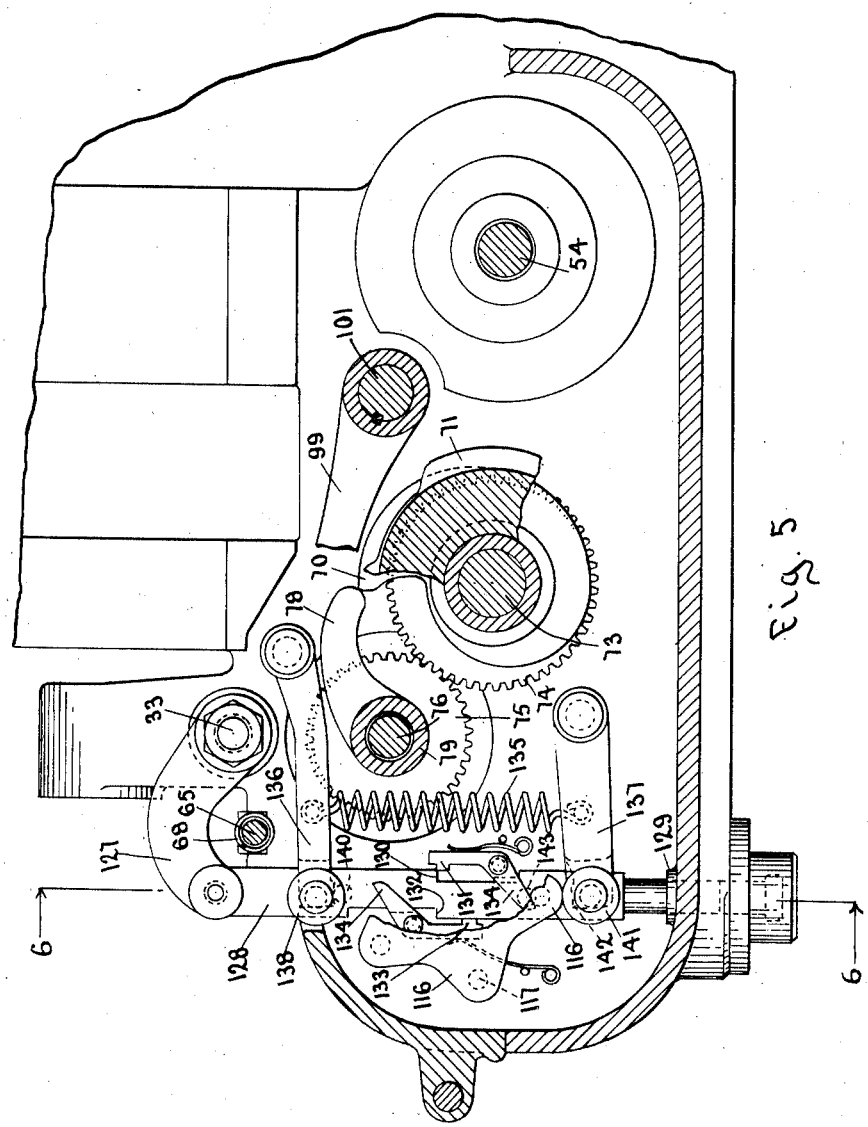

May 10, 1927.
E. R. FELLOWS
1,628,584
AUTOMATIC GEAR GENERATING MACHINE
Filed Oct. 18, 1922   6 Sheets-Sheet 6
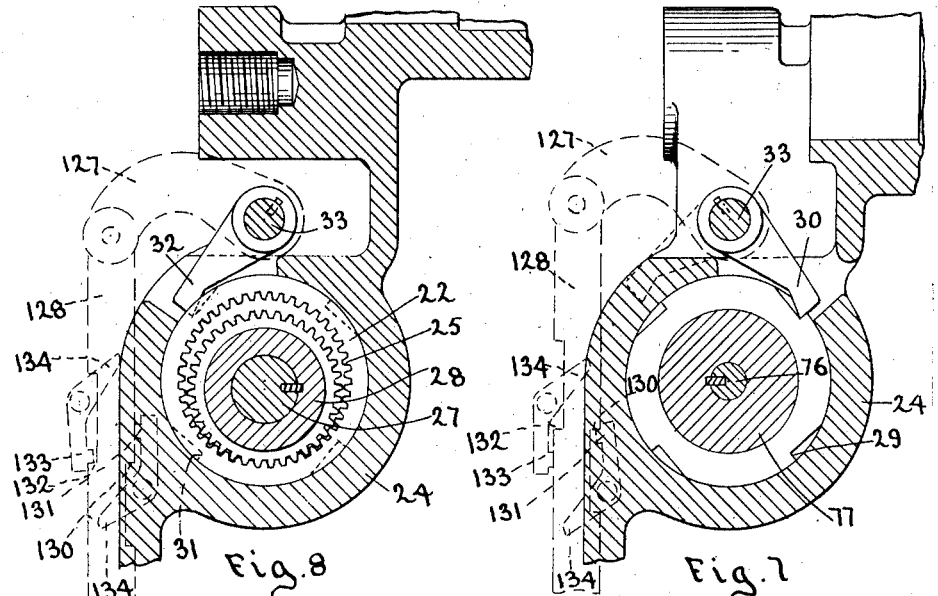
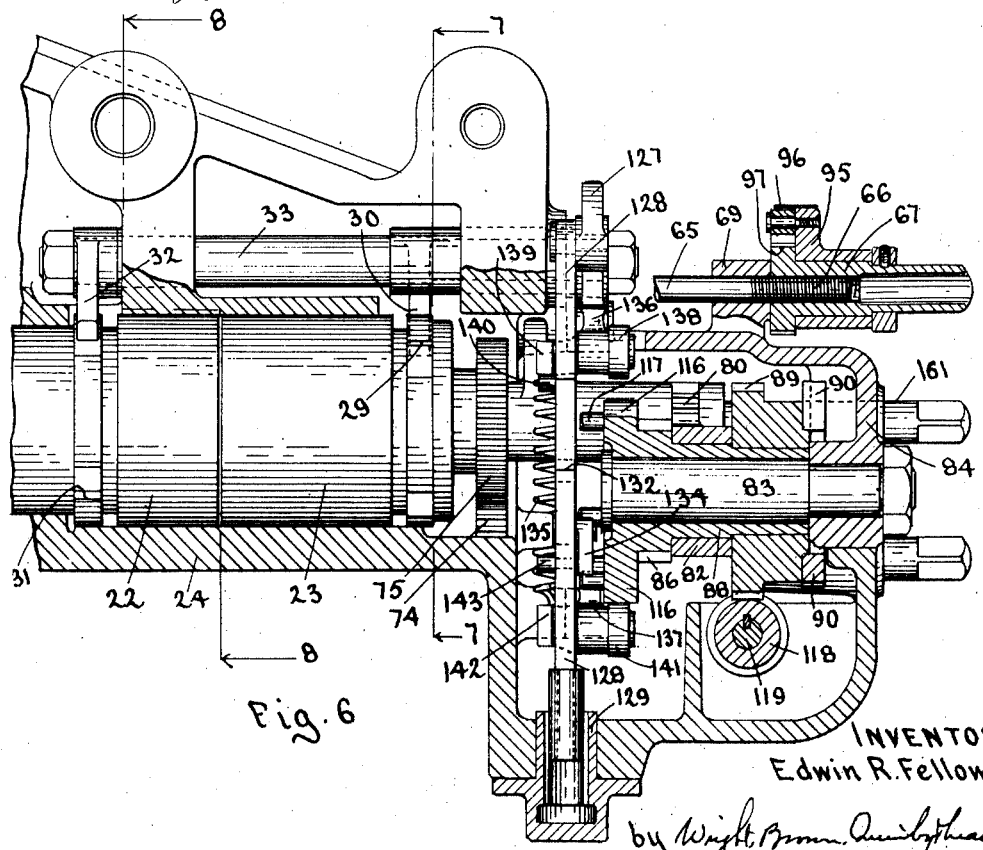
INVENTOR
Edwin R. Fellows Patented May 10, 1927.

1,628,584

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

AUTOMATIC GEAR-GENERATING MACHINE.

Application filed October 18, 1922. Serial No. 595,304.

The present invention relates to machines for generating and cutting curved forms, such as the faces of gear teeth, analogous forms, and others, by the action of a cutting tool between which and the work piece relative cutting travel and relative generating movement are effected. It is the general purpose and object of the invention to make the machine entirely automatic from the commencement to the completion of the following cycle of operations, or some of them, namely: performing a succession of similar cuts on similar parts of the work piece, in cases where the work piece possesses a number of such parts wherein prescribed curves are to be generated; effecting a feeding displacement between the work piece and the cutting tool after completion of a cutting operation on a given part of the work to permit subsequent cutting away of more stock from such part; shifting the cutting tool to effect its restoration to truth and good cutting condition and to maintain its cutting portion in correct position; truing the tool and restoring its cutting parts to good cutting condition, at the same time; and causing the steps of cutting, feeding, restoring the tool, etc., to take place repeatedly in the required order a number of times.

More specifically the invention is concerned with machines designed to finish to accurate form and sizes by a grinding operation previously shaped and hardened gears, and similar machine elements, and which employ a grinding wheel as the most practicable form of tool for carrying out that operation; and with reference to that particular use and combination my object is to grind all the teeth of the work piece in turn, feed the piece by turning it slightly with respect to the grinding wheel after each series of cuts, feed and true the wheel from time to time so as to maintain its working face always in the same position, and time the feeding and truing actions to occur between the conclusion of one series of cuts on the work and the commencement of the next series, all carried out automatically.

I have embodied the invention practically in mechanisms which are particularly designed and adapted to accomplish the above stated objects with the type of gear generating machine disclosed in my Patent No. 1,504,223, granted August 12, 1924, and have shown and described such particular embodiment as applied to that machine in this specification, for the purpose of explaining the principles of the invention. It should be understood, however, that these principles and the scope in which I claim protection are not limited to that particular embodiment or to its association with that particular machine otherwise than as required by the terms of my appended claims.

The principles of the invention and its characteristics can best be explained by a description in detail of the above-mentioned embodiment. Such a description is given in the following specification with reference to the accompanying drawings.

In the drawings:—

Figure 1 is a side elevation of a gear grinding machine of the type referred to, having applied thereto the mechanisms in which the present invention is embodied.

Figure 2:
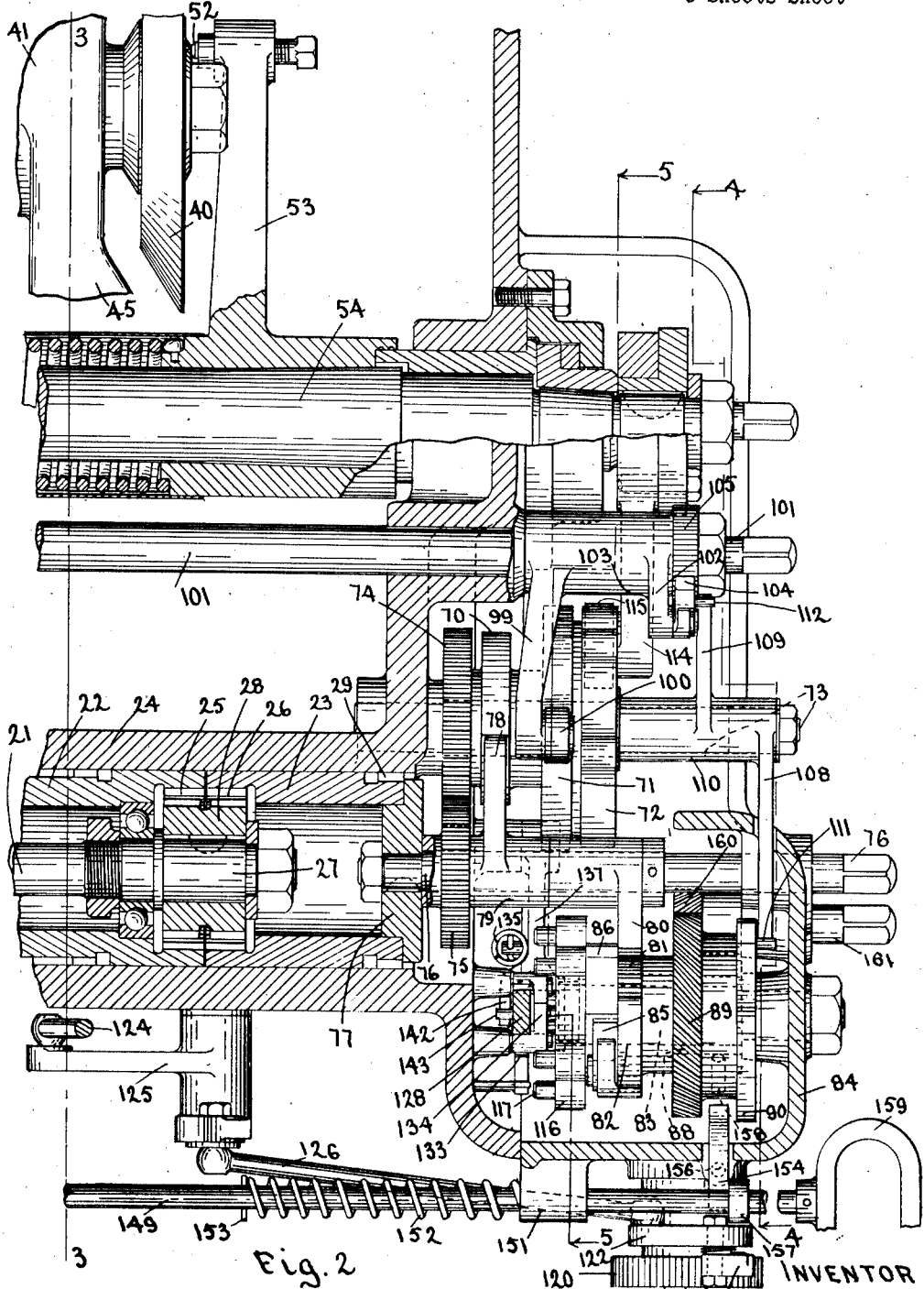
Figure 3:
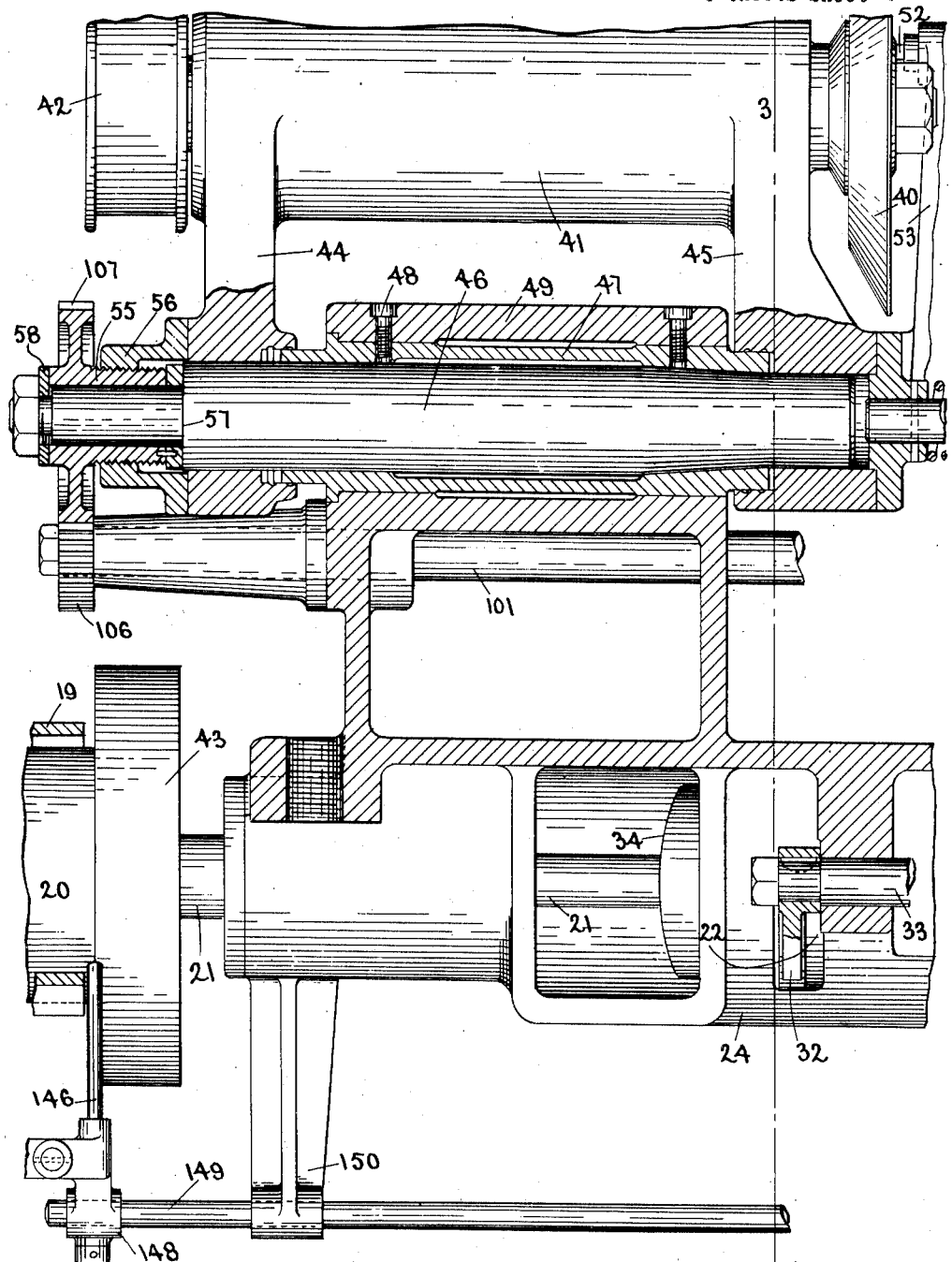

Figures 2 and 3 are horizontal sections taken on lines 2—2 and 3—3, respectively, of Figure 1, but on a larger scale.

Figure 4:
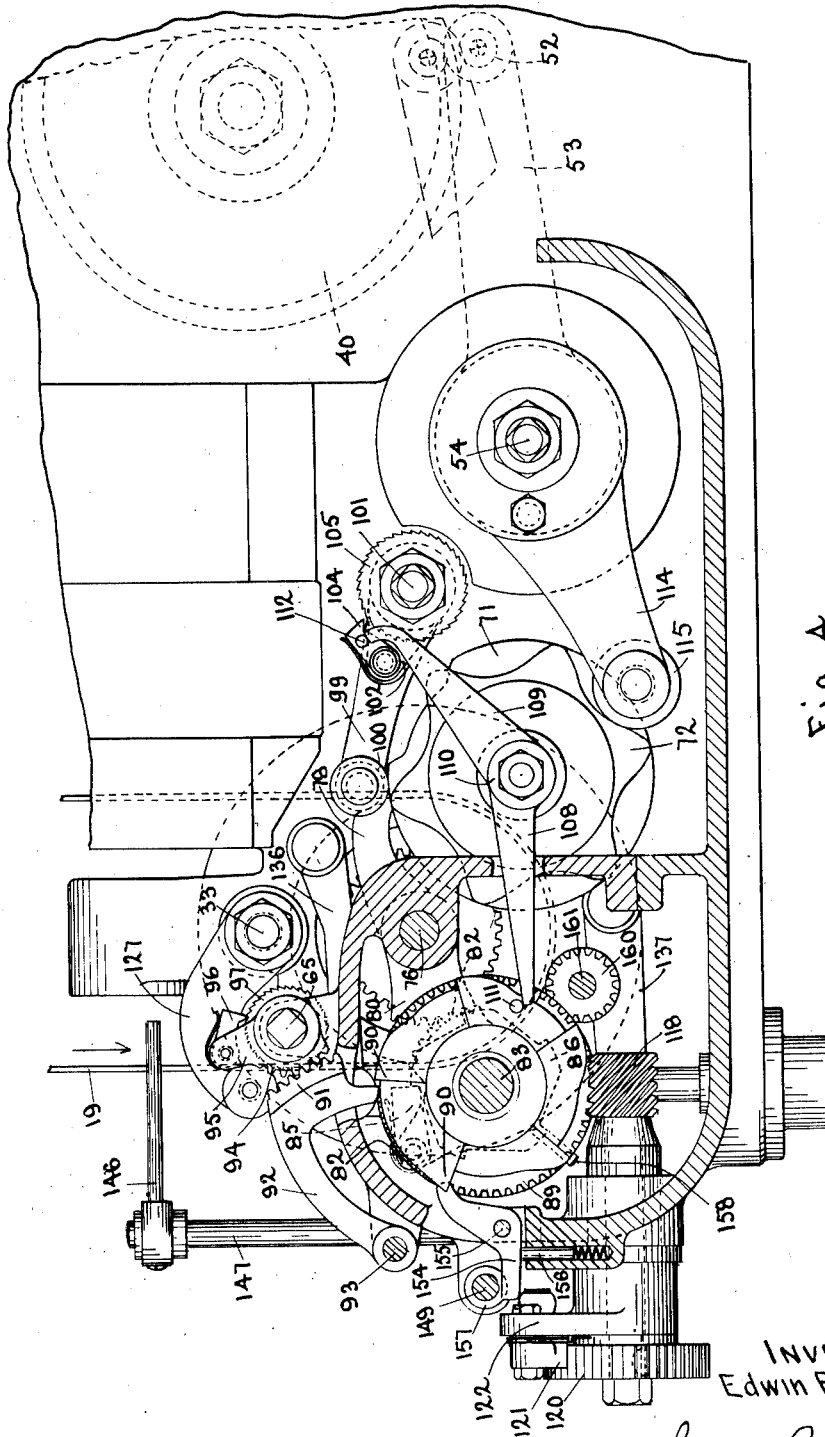

Figures 4 and 5 are cross sections on lines 4—4 and 5—5, respectively, of Figure 2.

Figure 6 is a cross section on line 6—6 of Figure 5.

Figures 7 and 8 are cross sections on lines 7—7 and 8—8, respectively, of Figure 6.

Like reference characters designate the same parts wherever they occur in all the figures.

The particular gear grinding machine here illustrated is one in which the work piece is given a resultant movement, composed of linear translation and axial rotation with respect to the grinding wheel, similar to the movement of a gear wheel when rolling in mesh with a stationary rack. To produce this motion the work piece, shown fragmentarily in dotted lines at 11 in Figure 1, is secured to a work spindle which is rotatably mounted in a carriage 12 having a sliding movement in an inclined plane on a bed 13. Such bed is a stationary part of the machine. The desired character of rolling movement is imparted to the work piece, during the travel of the carriage, by an element 14, which, for convenience of description, I have called a "former," such element being secured to the work piece and having a face $14^a$ making contact with the adjacent face on the end of a relatively stationary member 15 which, for convenience of description, I call the "former abutment." The face 14ª of the former and the complemental face of the abutment correspond in principle, respectively, to the face of a gear tooth and the face of a rack tooth conjugate thereto, and are appropriately formed to give to the work piece just the character of rolling movement relatively to the grinding wheel (shown by dotted lines at 16 in Figure 1) which will cause the latter to shape the tooth faces in the work piece to the desired curves. The terms "rack" and "gear" are here used in the broadest sense and do not necessarily imply that the face of the abutment is a plane. Any two complemental forms may be used for the faces of the former and of the abutment which will give to the carriage and work piece the desired motion.

A gear 17 is secured to the former and work piece, and a rack bar 18 meshes with the gear. When this rack bar is moved back and forth by mechanism presently described, it rotates the work spindle and at the same time either moves, or controls the movement of, the carriage through the pressure applied by the former against the abutment. The mechanism which reciprocates the rack bar comprises the following, for illustration of which attention is directed to Figures 2 and 6 as well as Figure 1. A belt 19 drives a pulley 20 fast on a shaft 21. This shaft extends through a sleeve 22 into an alined sleeve 23. Both of these sleeves are rotatably mounted in an encircling bearing 24 which forms part of the machine frame, and on their adjacent ends are provided with internal gear teeth 25 and 26, respectively. These two series of gear teeth are, in effect, internal sun gears. On the end of the shaft 24 is an eccentric pin or bearing 27 which carries a planet gear 28 in mesh with both of the internal gears 25 and 26. On the exterior of the sleeve 23 is a series of ratchet teeth or abutments 29 (see also Figure 7) coacting with a pawl or dog 30; and on the exterior of the sleeve 22 is a similar but reversed series of ratchet abutments 31 (Figures 6 and 8) coacting with a pawl or dog 32.

These two pawls are secured to a single rock-shaft 33 and are so arranged that by rocking the shaft either of the pawls may be engaged with one of the complemental abutments and the other disengaged from its abutment.

The gear 25 has a smaller number of teeth than the gear 26. Therefore revolution of the planet pinion, while the sleeve 23 is held fast, by the pawl 30, rotates the sleeve 22 with a slow motion; and when the sleeve 22 is prevented from rotating by the pawl 32, and sleeve 23 is released, the continued travel of the planet pinion in the same direction turns the sleeve 23 oppositely to the direction of rotation given to sleeve 22 under the first stated conditions. While the grinding is in progress to cut to a given depth, or make cuts to the same depth in series on all the teeth of the work piece, the sleeve 23 is held fast and rotation of the sleeve 22 is caused to reciprocate the work driving rack bar by means of a cam surface 34 (Figures 1 and 3) on the end of the sleeve, a lever 35 and a rock arm 36. Lever 35 carries a roll 37 which engages the cam 34, and has an abutment surface 38 on which bears a roll 39 carried by the arm 36. This latter arm is pivoted to the rack bar 18.

The grinding wheel 40 is mounted on a spindle which has its bearing in a carrier 41 and on which is mounted a driving pulley 42 driven by a belt from a pulley 43 on the main shaft 21. The holder 41 has arms 44 and 45 which are swiveled on a pivot bar 46. This bar is normally immovable, being driven friction tight into a sleeve 47 which is fastened by set screws 48 in a sleeve 49 forming a rigid part of the machine base. By swinging of the holder 41 around this pivot bar, the grinding wheel may be adjusted to work pieces of greater or less diameter, and such adjustments may be effected by means diagrammatically shown by dotted lines in Figure 1, consisting of a cam 50 rotatably mounted on the frame and engaging an abutment 51 on the wheel holder or carrier. Any suitable means may be provided for rotating said cam and for illustration of one of such means attention is directed to my previously mentioned Patent No. 1,504,223.

The end face of the grinding wheel is the active face, and this face must be dressed from time to time to keep it true and in good condition. For so dressing the wheel I have provided a truing tool 52 which may be of any already known or other suitable character, preferably a diamond, and is carried by an arm 53 mounted upon a shaft 54 and adapted to be oscillated by oscillations of said shaft. Automatic means are provided for thus oscillating the shaft which I will presently describe in connection with the means for effecting automatically other movements and adjustments of the machine.

The grinding wheel is adjustable lengthwise to bring it into position for dressing and to maintain its face in correct relation to the work spindle. For so adjusting it the entire holder is movable endwise on the pivot bar 46, being so moved by a sleeve 55 rotatably mounted on the reduced end of the bar 46 and formed externally as a screw which meshes with a nut 56 fastened securely to the grinding wheel holder. This sleeve is confined between a shoulder 57 and a washer 58 on the pivot bar so that it cannot move endwise relatively to the holder, wherefore its rotation causes the grinding wheel holder to be moved one way or the other.

Adjustments of the work relatively to the grinding wheel, so as to cause a cut to be taken and also to regulate the depth of cut, are made by raising or lowering the abutment 15. Since the active face of this abutment is inclined, necessarily its movement bodily up or down will displace the former and so cause angular movement to be given to the work spindle and to the work piece thereon. To permit such adjustments to be given to the abutment, it is carried by a slide 59 which is movable in a guideway 60 formed on a holding piece 61, as shown in Figure 1, and connected to the lower end of the slide 59 is a projection 62 which rests on the inclined surface of a cam or wedge piece 63. Such wedge piece is mounted in a horizontal guideway 64 and is connected with a stem 65 having a threaded end 66 (see Figure 6) which is meshed with complemental threads in the bore of a long nut or sleeve 67. A spring 68 abutting against one side of a fixed lug 69 (Figure 1) and pressing against a shoulder on stem 65, holds the nut sleeve against the opposite side of the lug and takes up back-lash, so that when the nut sleeve is rotated in either direction the wedge cam 63 is moved in proportion to the degree of such rotation.

As thus far described the machine is essentially like that disclosed in my said Patent No. 1,504,223 to which reference is directed for explanation of other characteristics and details which are not vital to the disclosure of the present invention. In these drawings I have shown only enough of the structure and mechanisms of the machine which is illustrated in my aforesaid patent to explain the utility and one specific manner of use of the means for automatic regulation, adjustment, and operation of a gear generating machine, in which the invention here claimed is embodied. In construing the scope of my present invention the particular machine illustrated may be considered as simply a vehicle for the presentation of the new steps involved in the present invention, and its special characteristics do not limit my present claims except in so far as such claims relate to new combinations of those special characteristics with other elements involved in the present automatic machine.

Taking up now the automatic operations which are accomplished as a result of the present invention, these are five in number, consisting of 1st feeding the work toward the grinding wheel by a distance equal to the thickness of the material to be removed at one cut; 2d, feeding the grinding wheel toward the dressing tool or diamond by a distance equal to the amount to be removed from the face of the wheel by truing; 3d, truing the wheel by moving the diamond or dressing tool back and forth across the face of the grinding wheel a given number of times at desired intervals in the cycle of the machine; 4th, timing the several events of the cycle by a central control mechanism; 5th, stopping the machine when the cycle is completed.

The feeding of the work, feeding of the grinding wheel and operation of the truing tool are severally accomplished by three cams. These are, respectively, the work feed cam 70, the wheel feed cam 71 and the wheel truing cam 72, all connected together as an integral or otherwise rigid unit and arranged to turn about a stud 73 which is mounted rigidly in the frame. Rigidly connected with these cams is a gear 74 which meshes with and is driven by a gear 75 fast on a shaft 76 which is also rigidly connected with the sleeve 23, previously described, by being passed through and keyed to a disk 77 which is bolted to the end of said sleeve.

*Work feed mechanism.*

The cam 70, which is the initial member of this mechanism and may be called, in distinction from a second cam, later described, the primary work feed cam, acts upon an arm 78 (Figures 2 and 5) which projects from a sleeve 79 mounted to turn freely on the shaft 76. This sleeve carries a second arm 80 (Figures 2 and 4) which is also a gear segment and has teeth on its outer end meshing with a complemental segment 81 formed on a part of a pawl carrier 82 which oscillates about a stud shaft 83 fixed in the front wall 84 of the base. The pawl carrier 82 carries a pawl 85 arranged to act against the teeth of a ratchet wheel 86 (Figures 2 and 4) which likewise turns upon the shaft 83 beside the pawl carrier. Preferably the ratchet 86 is integral with or fixed on a sleeve 88, as shown by dotted lines in Figure 2, on a part of which sleeve the pawl carrier 82 is rotatably mounted. Secured upon this sleeve is a helical gear 89, other purposes and functions of which are later described, the function for which it is now mentioned being to hold and carry on its hub a cam 90, which I may call the second work feed cam, composed of a number of segments, all or some of which are dissimilar to one another. Said cam acts upon a rack or gear segment 91, here shown as carried by an arm 92 which swings on a pivot 93, and such gear segment meshes with a complemental segment 94 which forms part of pawl carrier and sleeve 95 rotatably mounted on the internally threaded sleeve 67, previously mentioned, and carrying a pawl 96 which meshes with a ratchet 97 on said threaded sleeve. It may be noted that the construction and arrangement of this pawl and ratchet drive is such that the nut sleeve 67 is positively turned in the direction which moves the wedge cam 63 to the right with respect to Figure 1, that is, the direction which causes rise of the former abutment 15.

Referring again to cam 70 as shown in Figure 5, it will be seen that this cam has a gradual rise and an abrupt drop, the highest and lowest points being approximately on the same radius. The rise of this cam and the ratio of arms 78, 80 and 81 are proportioned to impart rotation to the cam 90 equal to one-half the angular extent of one of the segments of the latter. In this case, the specific action is to perform five successive grinding operations on all the teeth of a gear wheel, wherefore this cam has five segments and each of the movements given by the mechanism just described is one-tenth of a turn. Good grinding practice requires the first cuts to be heavier or deeper than the later cuts and, therefore, the cam segments which first act on the gear segment 91, after a new work piece has been applied, have a greater lift than those segments which come into action later, or at least than that which controls the depth of the finishing cut. The cam segments are removable and interchangeable with others having greater or less lift.

The feed, of course, is determined by the number of teeth or notches through which the ratchet 97 is caused to turn by each cam segment, and I may design such segments to turn the ratchet through the angle of one, two, or more notches, or not turn it at all. I may, indeed, perform the last one or two cuts without giving any additional feed to the work. As clearly shown in Figure 4, those segments of the cam which have any rise are formed so that the rise is limited to one-half or less of their angular extent, the remainder of their length being a dwell in order to permit independent stops of rotation by the timing mechanism, as will be later described.

Wheel feed mechanism.

The wheel feed cam 71 acts on an arm 99 carrying a roller 100 in contact with the rim of the cam, and being oscillatively mounted on a shaft 101. An arm 102 is connected with the arm 99 by means of a sleeve 103, and carries a pawl 104 meshing with a ratchet wheel 105 which is keyed to the shaft 101 (Figures 2 and 4). This shaft extends from front to rear of the machine and carries on its rear end a gear 106 in mesh with a gear 107 connected rigidly with the threaded sleeve 55 (Figure 3). As the cam 71 is a circular disk with a single notch or depression in its circumference, it gives a step of movement to the wheel feed with each of its rotations, except when the ratchet is made inoperative.

It is desirable that the feeding of the wheel be controllable in order that such feed may be omitted whenever desired; as, for instance, prior to the final or finishing cut, or at all times except just before the finishing cut, or before or after any other succession of cuts, as may be desired. So I have provided a means for disabling the wheel feed at the desired time. Such means comprises two arms 108 and 109 connected by a sleeve 110 which is journaled on the stud shaft 73 (see Figures 2 and 4). The arm 108 extends to a point where it may be engaged and depressed by a pin 111 projecting from the side of cam 90, and the other arm 109 extends in such proximity to a pin 112 projecting from the side of pawl 104 that, when arm 108 is depressed by pin 111, the pawl is lifted by arm 109 out of engagement with the ratchet 105. Such pin 111, or an equivalent device, may be located at any desired point in the cam or may be so made that it can be placed at any one of a desired number of different locations; or there may be two or more of such pins. In any event the locations of such pins determine the time at which the feeding of the grinding wheel will be omitted.

Wheel truing mechanism.

To the shaft 54, which mounts the truing tool as previously described, is secured an arm 114 carrying a roll 115 which bears on the cam 72. Said cam has a number of lobes, as many as desired within the limits imposed by the necessary length of path of the truing tool and the permissible steepness of the slopes of these lobes. Thus, when the cam 72 makes a complete rotation the truing tool is caused to sweep back and forth across the active face of the grinding wheel.

Timing mechanism.

This is the means which controls the operation of all of the mechanisms previously described. It is controlled in part by the work feed cam, previously described, and in part by the work driving mechanism. The central actuating member of this mechanism is a cam 116 (Figures 2 and 5), which I call the truing cam, having five, more or less, lobes in its periphery, and an equal number of pins 117 projecting from one end face. This cam is rigidly connected to the ratchet 86. It is, therefore, turned a step with each step of movement given to the ratchet. It is also turned whenever movement is given to the gear wheel 89, because the latter is rigidly connected with the ratchet as described. The wheel 89 meshes with a complemental spiral or skew gear 118 on a transverse shaft 119 which projects to the side of the machine, shown in Figs. 1 and 4 and is there provided with a ratchet wheel 120 actuated by a pawl 121 carried by a pawl carrier 122 which oscillates about the shaft 119. This pawl carrier is driven from the lever 35 of the work driving mechanism through an arm 123 on said lever, a connecting rod 124, a bell crank lever 125, and a connecting rod 126 extending from said bell crank to the pawl carrier 122 and being adjustable on the bell crank lever toward and away from the fulcrum thereof to regulate the angular movement given to the pawl carrier.

To the rock shaft 33, which carries the stop pawls 30 and 32, is connected an arm 127 to which, in turn, is pivoted a bar 128, said bar extending downwardly from the arm and being guided at its lower end in a guideway 129 in the frame. This bar has a shoulder 130 at one side, with which a stop dog 131 cooperates to hold it in its elevated position, and on its other side the bar has a shoulder 132 with which a stop dog 133 cooperates so as to hold the bar in its lowered position. Both said dogs are pivoted on stationary pins fixed in the frame and are spring-pressed toward the bar, as shown in Figure 5; and each has a tail piece 134 adapted to be engaged alternately by the various pins 117 in turn so as to release the dog from the complemental shoulder. Spring pressure is applied to the bar 128 alternately in opposite directions by means of a spring 135 acting through pivoted arms 136 and 137, to which the ends of said spring are connected, and controlled by the cam 116. Arm 136 carries a roll 138 adapted to coact with the cam, and it is also provided with a lug 139 (Figure 6) cooperating with a stud 140 on the rear side of bar 128. Similarly arm 137 carries a roll 141 to coact with cam 116 and a lug 142 to coact with a pin 143 projecting from the bar 128. The lobes and depressions of the cam are diametrically opposite, so that when a lobe depresses arm 137, for instance, a depression of the cam is opposite to roll 138 and arm 136 is pressed by the spring against the pin 140. Further the pins 117 on the cam and the stop dogs 131 and 133 are so related that while any cam lobe continues to exert downward pressure on the arm 137, one of the pins 117 releases dog 131 and allows the bar 128 to be moved under the pressure of spring 135. Such movement of the bar is enough to permit its shoulder 132 to be immediately overlaid and locked by dog 133.

When the cam lobe next adjacent to the roll 138 passes under the latter, it raises arm 136 and imparts tension to spring 135 which then presses upward on the bar through lug 142 and pin 143. When, thereafter, the pin 117 associated with the cam lobe now acting on roll 138, engages the tail of dog 133 and trips the latter, the spring raises bar 128 until shoulder 130 passes above and becomes interlocked with dog 131. Thus the several cam lobes and pins alternately apply spring pressure downwardly to the bar and then release the locking dog which holds it up, and then apply spring pressure upwardly to the bar and release the locking dog which at that time holds it down. With each downward movement of bar 128 the stop pawl 32 is rendered operative and the stop pawl 30 is brought into inoperative position, whereby the sleeve 22 having the internal sun gear 25 is held fast and the sleeve 23 is released; while with the upward movement of the bar the stop pawl 32 is released and the stop pawl 30 brought into operative position to arrest sleeve 23 and hold the internal sun gear 26 stationary. The mechanism consisting of the bar 128, dogs 131 and 133, spring 135 and arms 136 and 137 forms, in effect, what is known in the art as a "load and fire" mechanism. In combining the cam 116 with this mechanism, I have made what I believe is a new combination, in that I have provided a cam for applying the load to the mechanism and also for tripping it; and in addition to that, by giving the cam a number of lobes and tripping elements, I have caused the mechanism to operate alternately in both directions a number of times in each cycle or rotation of the cam.

*Stopping means.*

The machine is automatically stopped at the end of its cycle by a belt shifter mechanism under the control of the timing mechanism, which shifts the belt from the driving pulley 20 to a loose pulley 145 beside it on the shaft 21. The belt shifter itself is of a conventional type, consisting of a fork 146 embracing one stretch of the belt and carried by a rod 147 extending upwardly from a coupling 148, in which it is pivoted, which coupling is secured to a horizontal rod 149 sliding in guides 150 and 151 on the base. A spring 152 confined between the guide 151 and a pin 153 on the sliding rod tends to put the shifter in the position where the belt is on the loose pulley, but is normally restrained from so doing by a latch 154 pivoted at 155 to the frame (Figure 4) and normally held by a spring-pressed pin 156 against the sliding rod in position to obstruct a shoulder 157 on said rod. A pin 158 projects from the hub of gear 89 and is timed to engage a tail piece on latch 154 and trip the latter when the cycle of the machine is completed. A handle 159 on rod 149 is used to shift the belt onto the fast pulley in starting the machine; and in order that the latch may then be interlocked with the shoulder 57, the pin 158 must be moved out of the way of the tail piece. I have provided hand operated means for thus moving the pin through the short distance required for this purpose, such means comprising a pinion 160 in mesh with the gear 89 and mounted on a shaft 161 which extends from the front of the machine and is adapted to be turned by a wrench or crank applied to its end.

The various pawls and locking dogs which have been described in the foregoing description are all equipped with springs where necessary for holding them in engagement with their complemental ratchets and locking shoulders. The arms or equivalent parts which are actuated by the cams 70, 71, 72 and 90 are shown in these drawings as being urged by gravity toward the cams; and although I have not shown any springs for producing the same effect, it is evident that I may apply spring pressure in ways well understood by those skilled in the art in any case where it may be desired to supplement the force of gravity or where any of these parts are so re-arranged that gravity will not have the effect mentioned.

The complete operation is as follows: It is assumed that a new work piece has been applied to the work spindle and properly adjusted with respect to the grinding wheel for a first cut, and that the driving belt has been placed on the fast pulley 20, the belt shifter mechanism being then locked by the latch 154. At this time the timing cam 116 is in the position where it permits or causes the bar 128 to be raised and the dog 30 to be interlocked with one of the abutments 29 on the sleeve 23, as shown in Figures 5 and 7. Thus the sleeve 23 is prevented from rotating and the driving shaft 21 causes cam 34 to be turned with a slow motion by means of the differential mechanism consisting of the sun gears 25, 26 and planet pinion 28. With each rotation of the cam 34 a tooth of the work piece is rolled past the grinding wheel and back by means of the driving mechanism consisting of lever 35, arm 36, rack bar 18 and gear 17, and the work is indexed after each passage in one direction by means fully described in my prior application Serial No. 578,288, but not necessary to be shown here. With each back and forth swing of the lever so produced the ratchet wheel 120 is turned through an angle determined by the adjustment of connecting rod 126 in the bell crank 125 and by the diameter of the ratchet.

The ratchet 120 is interchangeable with other ratchets of different diameters and having different numbers of teeth, and pawl 121 is adjustable in the carrier 122 to accommodate such different ratchets. It is practically necessary that the ratchet either having the same number of teeth as the gear to be ground, or a multiple of such number, and that the stroke of the pawl be adjusted to turn the ratchet each time by the distance of one or more of its teeth. The result is that when the grinding operation has been effected once around the work the timing cam has been turned far enough, by means of the ratchet 120, shaft 119, and gears 118 and 89, to bring the timing cam 116 to the place where one of its pins 117 has released the locking dog 131, and one of its lobes has applied downward pressure on the bar 128 through arm 137, spring 135, arm 136, lug 139 and stud 140. On the instant of release of dog 131, the relation of the pawls or dogs 30 and 32 is reversed, dog 30 releasing sleeve 23 and dog 32 arresting sleeve 22.

The differential mechanism now drives the cams 70, 71 and 72 in unison by means of the gear train 75, 74, giving an increment of angular feed to the work piece through the work feeding mechanism, feeding the grinding wheel forward to permit its face to be dressed by the truing tool and swinging the truing tool back and forth across such face a number of times equal to the number of lobes of the cam 72, and thereby truing the wheel. The feeding movement of the grinding wheel takes place at once after its controlling cam has been set in motion, for the adjustment of said cam causes it to stop with the roll 100 lying in the depression of this cam close to the lifting part.

The movement given to the second cam 90 of the work feed mechanism is likewise imparted to the timing cam 116, because these two cams are rigidly connected and turned by the same pawl and ratchet device, and the movement so given to the timing cam causes it to be disengaged from the arm 137 and the locking dog 131, and to engage the arm 136 and eventually trip the dog 133. Then the spring 135 raises the bar 128 and shifts pawls 30 and 31 so as to arrest sleeve 23 and release sleeve 22.

This completes one cycle of the machine and the work driving mechanism comes into operation again as described, with the work in the new position to have a second cut taken on all of its teeth. So the operation continues until the prescribed number of grinding actions have been carried out. Previous to the last feeding adjustment, (in the particular arrangement here shown, although in other machines it may be at other times), the wheel feed is rendered inoperative by the pin 111 on the second work feed cam 90 moving the arms 108 and 109 to disengage the wheel feeding pawl. However, in case it is not desired to disable the wheel feed at this time, pin 111 may be removed.

Finally, when the last cut has been completed, the pin 158 trips the belt shifter latch 154 and the belt is shifted to the loose pulley by means of the spring 152, stopping the machine.

Various modifications in the construction and arrangement of the various mechanisms, and of the parts thereof, may be made without departing from the spirit of the invention or the protection which I claim, as will be readily understood by those skilled in the art. For instance, the timing cam 116 has been incorporated with the work feed mechanism because by so doing a valuable simplification of the mechanism has been effected. It is possible, however, to dissociate the timing mechanism from this particular construction and obtain the necessary cooperation in other ways. Therefore, although the specific combinations described and illustrated in this specification are preferred, they are not exclusive and my claims are to be construed accordingly.

Although the specific embodiment of the invention herein described is applied to a grinding machine, its principles are not altogether limited by the character of the cutting tool employed, but may to a greater or less extent be adapted and applied to other types of machine, such as those equipped with metallic cutters.

What I claim and desire to secure by Letters Patent is:

1. A machine adapted to cut forms in a work piece with generating motion corresponding to rack and pinion travel and including, in combination with a cutting tool, a work holder and driving mechanism for producing relative motions of generation and cutting between said cutting tool and a work piece held by said work holder, and an automatic feeding mechanism operative so to change the relation between the work piece and the cutting tool as to cause a further cutting of the same part of the work piece previously cut.

2. A machine adapted to cut forms in a work piece with generating motion corresponding to rack and pinion travel and including, in combination with a cutting tool, a work holder and driving mechanism for producing relative motions of generation and cutting between said cutting tool and a work piece held by said work holder, a feeding mechanism operative so to change the relation between the work piece and the cutting tool as to cause further cutting of a part previously cut, and automatic means for causing said driving mechanism and said feeding mechanism to become operative in alternation.

3. A generating and cutting machine comprising a cutting tool, a work holder, driving mechanism adapted to produce a compound relative motion of rotation and translation in a straight line between the work holder and cutting tool, and an automatic work feeding mechanism adapted so to change the position of a work piece with respect to the cutting tool as to cause further cutting of a part previously cut.

4. A generating and cutting machine comprising a cutting tool, a work holder, driving mechanism adapted to produce a compound relative motion of rotation and translation between the work holder and cutting tool, a work feeding mechanism adapted so to change the position of a work piece with respect to the cutting tool as to cause further cutting by said tool of a part of the work piece previously cut, a common source of power for said driving mechanism and said feeding mechanism, and timing means arranged and operable to put said source of power in connection exclusively with the driving mechanism and the feeding mechanism in turn.

5. A machine for generating and cutting prescribed forms in a work piece comprising the combination of a cutting tool, a work holder adapted to hold a work piece, means for giving a rolling motion to said work piece relatively to the cutting tool, said means including a former connected to the work piece, a stationary abutment in contact with the face of said former, and elements adapted to impart rotation to the former and work piece combined with automatic means for shifting said abutment to feed the work relatively to the cutting tool.

6. A machine for generating and cutting prescribed forms in a work piece comprising the combination of a cutting tool, a work holder adapted to hold a work piece, means for giving a rolling motion to said work piece relatively to the cutting tool, said means including a former connected to the work piece, a stationary abutment in contact with the face of said former, and elements adapted to impart rotation to the former and work piece, said abutment being shiftable to feed the work relatively to the cutting tool, a primary power delivering element, connections by which said element is adapted to transmit motion to either said rotation-producing elements or to said abutments, and automatic means for rendering each of said connections operative in turn and making the other of said connections inoperative at the same time.

7. An automatic machine for finishing previously shaped work pieces having a plurality of similar peripheral projections, which comprises the combination with a cutting tool, a rotatable spindle to which the work piece is connected, a traveling carriage in which said spindle is arranged, a former connected to said spindle and an abutment in contact with said former, of a driving mechanism operable to impart rotation to said spindle and former, and an automatic feeding mechanism associated with said abutment and operable to move the same.

8. An automatic machine for finishing previously shaped work pieces having a plurality of similar peripheral projections, which comprises the combination with a cutting tool, a rotatable spindle to which the work piece is connected, a traveling carriage in which said spindle is arranged, a former connected to said spindle and an abutment in contact with said former, of a driving mechanism operable to impart rotation to said spindle and former, a feeding mechanism associated with said abutment and operable to move the same, a source of power, and automatic means for coupling said source of power alternately to said driving mechanism and to said feeding mechanism.

9. A generating and cutting machine comprising a cutting tool, a work holder, driving mechanism adapted to produce compound translative movements of rotation and translation, corresponding to rack and pinion travel, between the work holder and the cutting tool, a work feeding mechanism adapted so to change the position of a work piece with respect to the cutting tool as to cause further cutting of a part previously cut, a source of power, and automatic means for coupling said source of power alternately to said driving mechanism and to said feeding means.

10. An automatic machine for finishing previously shaped work pieces having a plurality of similar peripheral projections, which comprises the combination with a traveling cutting tool, a rotatable spindle to which the work piece is connected, a traveling carriage in which said spindle is arranged, a former connected to said spindle, and an abutment in contact with said former, of a driving mechanism adapted to impart back and forth rotation to said spindle and former, a feed mechanism adapted to transmit displacement movement to said abutment, a source of power including differential mechanism having a take-off element arranged to operate the driving mechanism, and a second take-off element arranged to drive said feeding mechanism, and timing means arranged and operative to arrest the movement of each of said take-off elements in turn.

11. A machine according to claim 10 in which said differential mechanism comprises sun gears connected with the respective take-off elements and a planet gear driven by the source of power and meshing with both said sun gears.

12. A generating and cutting machine comprising a cutting tool, a work holder, driving mechanism adapted to produce a compound relative motion of rotation and translation, corresponding to rack and pinion travel, between the work holder and the cutting tool, a work feeding mechanism, a common source of power for said driving mechanism and said work feeding mechanism, timing means operable to put said source of power into condition for operating the driving and feeding mechanisms alternately, and connections by which the driving mechanism and the feeding mechanism each drives the timing mechanism.

13. An automatic machine for finishing previously shaped work pieces having a plurality of similar peripheral projections, which comprises the combination with a cutting tool, a rotatable spindle to which the work piece is connected, a traveling carriage in which said spindle is arranged, a former connected to said spindle, and an abutment in contact with said former, a driving mechanism coupled to oscillate said spindle and former in unison, a feed mechanism coupled to the former abutment and operable to shift the latter whereby to change the angular relation of the spindle and work piece to the cutting tool, a source of power including means for operating either said driving mechanism or said feeding mechanism exclusively, a timing mechanism arranged and operable to put said source of power into condition for operating the driving and feeding mechanism alternately, and connections by which the driving mechanism and the feeding mechanism each drives the timing mechanism.

14. In a machine of the character described, a differential mechanism comprising a driving planet gear, two sun gears, each in mesh with said planet gear, a driving mechanism driven by one of said sun gears, a feeding mechanism driven by the other of said sun gears, stops for preventing rotation of said sun gears, said stops being connected to one another and arranged so that when either is engaged with its sun gear the other is out of engagement with its sun gear, a shifter for said stops, and a timing cam adapted to cause movement of said shifter alternately in opposite directions, whereby to engage said stops alternately with their respective sun gears.

15. In a machine of the character described, a differential mechanism comprising a driving planet gear, two sun gears, each in mesh with said planet gear, a driving mechanism driven by one of said sun gears, a feeding mechanism driven by the other of said sun gears, stops for preventing rotation of said sun gears, said stops being connected to one another and arranged so that when either is engaged with its sun gear the other is out of engagement with its sun gear, a shifter for said stops, a timing cam adapted to cause movement of said shifter alternately in opposite directions, whereby to engage said stops alternately with their respective sun gears, and means by which said timing cam is driven in turn by said driving mechanism and said feeding mechanism.

16. An automatic machine for finishing previously shaped work pieces having a plurality of similar peripheral projections, which comprises the combination with a cutting tool, a rotatable spindle to which the work piece is connected, a traveling carriage in which said spindle is arranged, a former connected to the spindle, and an abutment in contact with said former, of a driving mechanism for operating the spindle and former, feeding mechanism for shifting said abutment, whereby to change the relation of the work piece to the cutting tool, and automatic control means for causing action of said driving mechanism in repeated alternation with operation of said feeding mechanism.

17. An automatic machine for finishing previously shaped work pieces having a plurality of similar peripheral projections, which comprises the combination with a cutting tool having an operative face normally acting in a given plane, a work holder, means including a driving mechanism for imparting motion to the work holder relatively to the cutting tool in the manner required to cause traverse of the work piece over the operative tool face, of a dressing tool operable in said given plane across the operative face of the cutting tool, automatic mechanism for feeding the cutting tool to the dressing tool, and automatic control means for causing operation of said driving means in alternation with actuations of the cutter feeding mechanism and of the dressing tool.

18. An automatic machine for finishing previously shaped work pieces having a plurality of similar peripheral projections, which comprises the combination with a cutting tool, having an operative face normally acting in a given plane, a work holder, means including a driving mechanism for imparting motion to the work holder relatively to the cutting tool in the manner required to cause traverse of said projections in turn over the operative tool face, of a dressing tool operable in said given plane across the operative face of the cutting tool to maintain said tool in condition, and automatc means for operating said dressing tool.

19. An automatic machine for finishing previously shaped work pieces having a plurality of similar peripheral projections, which comprises the combination with a cutting tool having an operative face normally acting in a given plane, a work holder, means including a driving mechanism for imparting motion to the work holder relatively to the cutting tool in the manner required to cause traverse of said projections in turn over the operative tool face, of a dressing tool operable in said given plane across the operative face of the cutting tool to maintain said tool in condition, automatic means for operating said dressing tool, and controlling means arranged and automatically operated for causing action of said driving means in repeated alternation with actuations of said dressing tool.

20. An automatic machine for finishing previously shaped work pieces having a plurality of similar peripheral projections, which comprises the combination with a cutting tool having an operative face normally acting in a given plane, a work holder, means including a driving mechanism for imparting motion to the work holder relatively to the cutting tool in the manner required to cause traverse of said projections in turn over the operative tool face, of feeding mechanism for shifting the relation of the work piece to cause further cutting of the said peripheral projections, a dressing tool operable in said given plane across the operative face of the cutting tool, feeding mechanism for advancing the cutting tool to said dressing tool for causing the active part of the cutting tool to be maintained in cutting condition and in a prescribed location, and automatic control means for causing action of said driving means in repeated alternation with simultaneous actuations of the feeding mechanism, the cutter feeding means and the dressing tool.

21. An automatic gear grinding machine comprising the combination with a grinding wheel and a work holder adapted to roll a gear blank relatively to said grinding wheel in the manner of a gear rolling in mesh with a rack, mechanism for repeatedly oscillating and indexing the work piece with respect to the grinding wheel, so as to perform grinding operations of given depth in turn upon all of the teeth of the work piece, mechanism for giving a feeding movement of rotation around its axis to the work piece relatively to the grinding wheel, and timing means for causing said grinding and feeding actions to be effected in turn.

22. An automatic gear grinding machine comprising the combination with a grinding wheel and a work holder adapted to roll a gear blank relatively to said grinding wheel in the manner of a gear rolling in mesh with a rack, mechanism for repeatedly oscillating and indexing the work piece with respect to the grinding wheel, so as to perform grinding operations of given depth in turn upon all of the teeth of the work piece, a wheel truing device operable in a fixed path across the face of the grinding wheel, automatic mechanism for feeding the grinding wheel toward the path of said truing wheel, and timing mechanism arranged and operable to cause intermission of the grinding motion of the work piece and, during said intermission, to effect feeding movement of the work piece and of the grinding wheel, and to move the truing tool across the face of the wheel.

23. An automatic gear grinding machine comprising the combination with a grinding wheel and a work holder adapted to roll a gear blank relatively to said grinding wheel in the manner of a gear rolling in mesh with a rack, mechanism for repeatedly oscillating and indexing the work piece with respect to the grinding wheel, so as to perform grinding operations of given depth in turn upon all of the teeth of the work piece, mechanism for giving a feeding movement of rotation around its axis to the work piece relatively to the grinding wheel, a wheel truing device operable in a fixed path across the face of the grinding wheel, automatic mechanism for feeding the grinding wheel toward the path of said truing wheel, and timing mechanism arranged and operable to cause intermission of the grinding motion of the work piece and, during said intermission, to effect feeding movement of the work piece and of the grinding wheel, and to move the truing tool across the face of the wheel.

24. In a gear grinding machine, a work spindle, a former coupled with said spindle to be movable equiangularly therewith, an abutment against which said former is adapted to bear, said abutment being adjustable in a line other than parallel to that surface thereof on which the former bears, and automatic mechanism for adjusting said abutment.

25. In a gear grinding machine, a work spindle, a former coupled with said spindle to be movable equiangularly therewith, an abutment against which said former is adapted to bear, said abutment being adjustable in a line other than parallel to that surface thereof on which the former bears, and automatic mechanism for adjusting said abutment in alternation with grinding actions of the machine whereby to adjust the work.

26. In a gear grinding machine, a work spindle, a former coupled with said spindle and movable angularly in unison therewith, an abutment having a face against which said former is adapted to bear, said abutment being adjustable in a line other than parallel to said face, and automatic mechanism for adjusting said abutment comprising a source of power, and a cam arranged to impart movement to the abutment in said line.

27. In a gear grinding machine, a work spindle, a former coupled with said spindle to be movable equiangularly therewith, an abutment against which said former is adapted to bear, said abutment being adjustable in a line other than parallel to the surface thereof on which the former bears, and automatic mechanism for adjusting said abutment comprising a source of power, a cam, and a nut and screw couple, one of the members of which is driven by said cam, and the other member of which is associated with the abutment so as to impart movement thereto when the cam connected member of said couple is rotated.

28. In an automatic grinding machine adapted to produce a finished surface in a number of cuts, the combination with a grinding wheel and work-holding and driving means adapted to effect relative generating travel between a work piece and the grinding wheel, a feed cam having a series of lifts and depressions, a pawl and ratchet mechanism operable step by step by the lifts and depression of said cam, a work feeding means coupled with said pawl and ratchet mechanism, and means for producing traverses of the work piece past the grinding wheel in alternation with successive steps in the movement of said cam.

29. In a gear grinding machine, a grinding wheel, a work holder adapted to support and roll a work piece in a manner to cause its tooth faces to traverse and be ground by the grinding wheel, mechanism for giving a series of such movements to the work piece, feed mechanism for giving successive steps of angular feed movement to the work piece, and timing mechanism for causing such steps of feed movement to occur in intermissions between successive series of the aforesaid traverses of the work piece.

30. An automatic gear grinding machine comprising a dressing tool mounted to operate in a given plane, mechanism for actuating said dressing tool, a grinding wheel adapted to operate with its active face in said plane and being adjustably mounted to bring its said face into said plane and into position for being dressed by said dressing tool after wearing of said active face, automatic mechanism for so adjusting said grinding wheel, a work holder arranged to support and roll a gear wheel relatively to said grinding wheel in a manner to cause the tooth faces of said gear wheel to traverse and be ground by the active face of said grinding wheel, mechanism for giving a series of such movements to said work holder and gear, feed mechanism for giving successive steps of angular feed movement to said gear, and timing mechanism for causing such steps of feed movement of the gear, and adjustments of the grinding wheel, and actions of the dressing tool to occur at predetermined regular times during intermissions in the grinding traverses of the gear.

31. An automatic gear grinding machine comprising a dressing tool operable in a prescribed location, automatic mechanism for operating said dressing tool, a grinding wheel mounted and operating with its active face in position to be acted upon and dressed by said dressing tool, automatic mechanism for advancing said grinding wheel toward the dressing tool by prescribed steps of movement, a work holder for a gear shaped work piece arranged and operable to roll the tooth faces of said work piece with a generating motion relatively to the active face of the grinding wheel, mechanism for causing a prescribed number of such rolling traverses of the work piece to take place in succession, indexing means for shifting the work piece to present different teeth thereof to the grinding wheel between successive traverses, feed mechanism for giving successive steps of angular feed movement to the work piece, timing mechanism for causing such traverses of the work piece, feed movements thereof, adjustments of the grinding wheel, and operations of the dressing tool to take place in a predetermined sequence, and an automatic stop mechanism for stopping the machine at the end of a prescribed number of such traverses of the work piece.

32. In an automatic gear grinding machine, a grinding wheel, a work holder adapted to support and roll a work piece in a manner to cause its tooth faces to traverse and be ground by said grinding wheel, mechanism for giving a series of such traverses to the work piece, feed mechanism for giving successive steps of angular feed movement to the work piece, timing mechanism for causing such steps of feed movement to occur in intermissions between successive series of the aforesaid traverses of the work piece, and an automatic stopping mechanism for stopping the machine at the end of a number of such series of such traverses.

33. In a gear grinding machine, a grinding wheel, a work holder adapted to rotate a work piece, a movable carriage supporting said holder rotatably, a former connected to said work holder, a normally stationary abutment having a face on which said former bears, mechanism for giving a series of angular movements to said work holder and former whereby to produce a compound rolling movement of the work piece relatively to the grinding wheel, said abutment being displaceable for giving angular feeding movements to the work holder, mechanism for so displacing the abutment, and timing mechanism for causing actions of said displacing mechanism to occur in intermissions between series of movements of the work holder.

34. An automatic gear grinding machine comprising a grinding wheel having an active face, a dressing tool for said active face mounted in position to act upon and dress the grinding wheel when the latter is in its operative grinding position, automatic means for feeding the grinding wheel toward the dressing tool, automatic means for operating said dressing tool, whereby the grinding wheel face is maintained in a prescribed location and condition of truth, a work holder adapted to carry and rotate a gear shaped work piece, a movable carriage supporting said holder rotatably, a former connected to said work holder, a normally stationary abutment having a face on which said former bears, mechanism for giving a series of angular movements to said work holder and former and simultaneous translative movements to said carrier, whereby to produce a compound rolling movement of the work piece relatively to the grinding wheel, said abutment being displaceable for giving angular feeding movements to the work holder, mechanism for so displacing the abutment, means for giving indexing movements to the work piece from time to time, and timing mechanism for causing actions of said displacing mechanism, of said wheel feeding mechanism, and said dressing tool to occur in intermissions between series of movements of the work holder.

35. An automatic gear grinding machine comprising a grinding wheel having an active face, a dressing tool for said active face mounted in position to act upon and dress the grinding wheel when the latter is in its operative grinding position, automatic means for feeding the grinding wheel toward the dressing tool, automatic means for operating said dressing tool, whereby the grinding wheel face is maintained in a prescribed location and condition of truth, a work holder adapted to carry and rotate a gear shaped work piece, a movable carriage supporting said holder rotatably, a former connected to said work holder, a normally stationary abutment having a face on which said former bears, mechanism for giving a series of angular movements to said work holder and former and simultaneous translative movements to said carrier, whereby to produce a compound rolling movement of the work piece relatively to the grinding wheel, said abutment being displaceable for giving angular feeding movements to the work holder, mechanism for so displacing the abutment, means for giving indexing movements to the work piece from time to time, timing mechanism for causing actions of said displacing mechanism, of said wheel feeding mechanism, and said dressing tool to occur in intermissions between series of movements of the work holder, and automatic stopping mechanism for stopping the machine at the end of a prescribed number of operations.

36. In a gear grinding machine, a grinding wheel, a work holder adapted to rotate a work piece, a movable carriage supporting said holder rotatably, a former connected to said work holder, a normally stationary abutment having a face on which said former bears, mechanism for giving a series of angular movements to said work holder and former and translative movements to said carriage whereby to produce a compound rolling movement of the work piece relatively to the grinding wheel, said abutment being displaceable for giving angular feeding movements to the work holder, mechanism for so displacing the abutment, means for indexing the work piece from time to time, timing mechanism for causing actions of said displacing mechanism to occur in intermissions between series of movements of the work holder, and an automatic stopping mechanism for stopping the machine at the end of a number of rolling and feeding movements of the work.

37. In an automatic gear grinding machine, a rotatable grinding wheel, a truing tool movable back and forth across the face of the grinding wheel, automatic means for feeding said wheel toward the path of the truing tool, timing means arranged and operable to cause action of said feeding means at given times, and means controlled by said timing mechanism for disabling said feeding means at a predetermined time in the cycle of the machine.

38. In an automatic gear grinding machine, a rotatable grinding wheel, a truing tool movable back and forth across the face of the grinding wheel, automatic means for feeding said wheel toward the path of the truing tool, said means including a pawl and ratchet mechanism and a cam actuating said pawl and ratchet mechanism, timing means arranged and operable to cause action of said cam at given times, and means controlled by said timing mechanism for disabling said pawl and ratchet mechanism at a predetermined time in the cycle of the machine.

39. In an automatic gear grinding machine, a rotatable grinding wheel, a truing tool movable back and forth across the face of said grinding wheel, and a cam operated means for feeding said wheel toward the path of said truing tool, such feeding means being automatically operable at a predetermined time in the cycle of the machine.

40. An automatic gear generating machine comprising two sun gears, a driving planet gear in mesh with said sun gears, stops complemental to said sun gears for preventing rotation thereof, said stops being coupled together and operable to cause arrest of either of said sun gears and release of the other at the same time, a work piece holder, mechanism driven by one of said sun gears for giving a rolling motion to a work piece mounted upon said holder, a cutter arranged operatively to remove material from said rolling work piece, means driven by the other of said sun gears for effecting a change in the relation of the work piece to the cutter, and a controlling mechanism for said sun gear stops driven in turn by that one of the sun gears which is in motion.

41. In a machine of the class described two trains of independently operating mechanisms, a single source of power for both mechanisms and means for causing said source of power to drive each train successively in turn, said last-named means comprising a back and forth movable shifter bar, stops operative alternately to hold said bar in either of its extremes of movement, spring connected floating abutments arranged to apply pressure oppositely to said bar in approximately the path of movement thereof, and a timing cam having means for shifting said abutments in turn out of engagement with the bar, while at the same time applying stress through the spring to the other of said abutments, and also having means for disengaging said stops in turn.

42. In a machine of the class described, two trains of independently operating mechanism, a single source of power for both mechanisms, a load and fire mechanism for causing said source of power to drive each train successively in turn, and a cam arranged and operable to apply loading upon and to trip said load and fire mechanism.

43. In a machine of the class described, two trains of independently operating mechanism, a single source of power for both mechanisms, a load and fire mechanism for causing said source of power to drive each train successively in turn, said load and fire mechanism including stops adapted to prevent its movement in respectively opposite directions, and a cam having provisions for first applying load to said mechanism in one direction and tripping the stop which prevents movement in that direction, and then applying loading to the mechanism in the opposite direction and tripping the stop which prevents movement in such opposite direction.

44. A machine as set forth in claim 43, in which said cam has a plurality of load applying and stop tripping means whereby to cause repeated actions of the load and fire mechanism in opposite directions in the course of a single rotation of the cam.

45. In a machine of the class described, two trains of independently operating mechanism, a single source of power for both mechanisms, a load and fire mechanism for causing said source of power to drive each train successively in turn, a cam arranged and operable to apply loading upon and to trip said mechanism, and connections by which each train of mechanism in turn drives said cam.

In testimony whereof I have affixed my signature.

EDWIN R. FELLOWS.